United States Patent
Garnweidner et al.

(10) Patent No.: US 6,761,412 B1
(45) Date of Patent: Jul. 13, 2004

(54) BACKREST CONSTRUCTION

(75) Inventors: Peter Garnweidner, Lamprechtshausen (AT); Christian Danninger, Strasswalchen (AT)

(73) Assignee: Euromotive Ges. m.b.H., Ranshofen (AT)

( * ) Notice: Subject to any disclaimer, the term of this patent is extended or adjusted under 35 U.S.C. 154(b) by 0 days.

(21) Appl. No.: 09/329,229

(22) Filed: Jun. 10, 1999

(30) Foreign Application Priority Data

Jun. 16, 1998 (DE) .......................... 198 26 732

(51) Int. Cl.$^7$ ................................................ A47C 7/02
(52) U.S. Cl. ................................................ 297/452.18
(58) Field of Search .......................... 297/452.18, 452.2

(56) References Cited

U.S. PATENT DOCUMENTS

| | | | |
|---|---|---|---|
| 5,029,942 A | | 7/1991 | Rink |
| 5,123,706 A | * | 6/1992 | Granzow et al. ...... 297/452.18 |
| 5,685,614 A | | 11/1997 | Chabanne |
| 5,791,738 A | * | 6/1998 | Niezoldt ............ 297/452.18 X |
| 5,897,168 A | * | 4/1999 | Bartelt et al. .......... 297/452.18 |
| 5,918,943 A | * | 7/1999 | Mitschelen et al. .... 297/452.18 |
| 6,019,273 A | * | 2/2000 | Garnweidner .......... 297/452.18 |

FOREIGN PATENT DOCUMENTS

| | | |
|---|---|---|
| DE | 196 00 551 | 8/1996 |
| EP | 0 745 508 | 12/1996 |
| EP | 0 776 621 | 6/1997 |
| EP | 0 794 878 | 9/1997 |
| GB | 2 305 638 | 4/1997 |
| WO | WO 96/16833 | 6/1996 |
| WO | WO 97/46413 | 12/1997 |
| WO | WO 98/08705 | 3/1998 |

OTHER PUBLICATIONS

Patent Abstracts of Japan, vol. 015, No. 443 (M–1178), Nov. 12, 1991, & JP 03 189109 A (Mazda Motor Corp.), English Abstract.

* cited by examiner

*Primary Examiner*—Anthony D. Barfield
(74) *Attorney, Agent, or Firm*—Nixon Peabody LLP; David S. Safran

(57) ABSTRACT

A backrest construction for the front seat of a motor vehicle, with a backrest frame (1), a backrest head (2), node points (5) arranged on both sides of the lower part of the backrest frame (1) and a lower crossbeam (6) arranged between the node points (5). To be able to manufacture the backrest construction in a lightweight design, some of the structural parts, namely the backrest frame (1) and the crossbeam (6), for example, are made of extruded sections, while the other structural parts, such as the node points (5) and the backrest head (2) are die-cast parts.

1 Claim, 1 Drawing Sheet

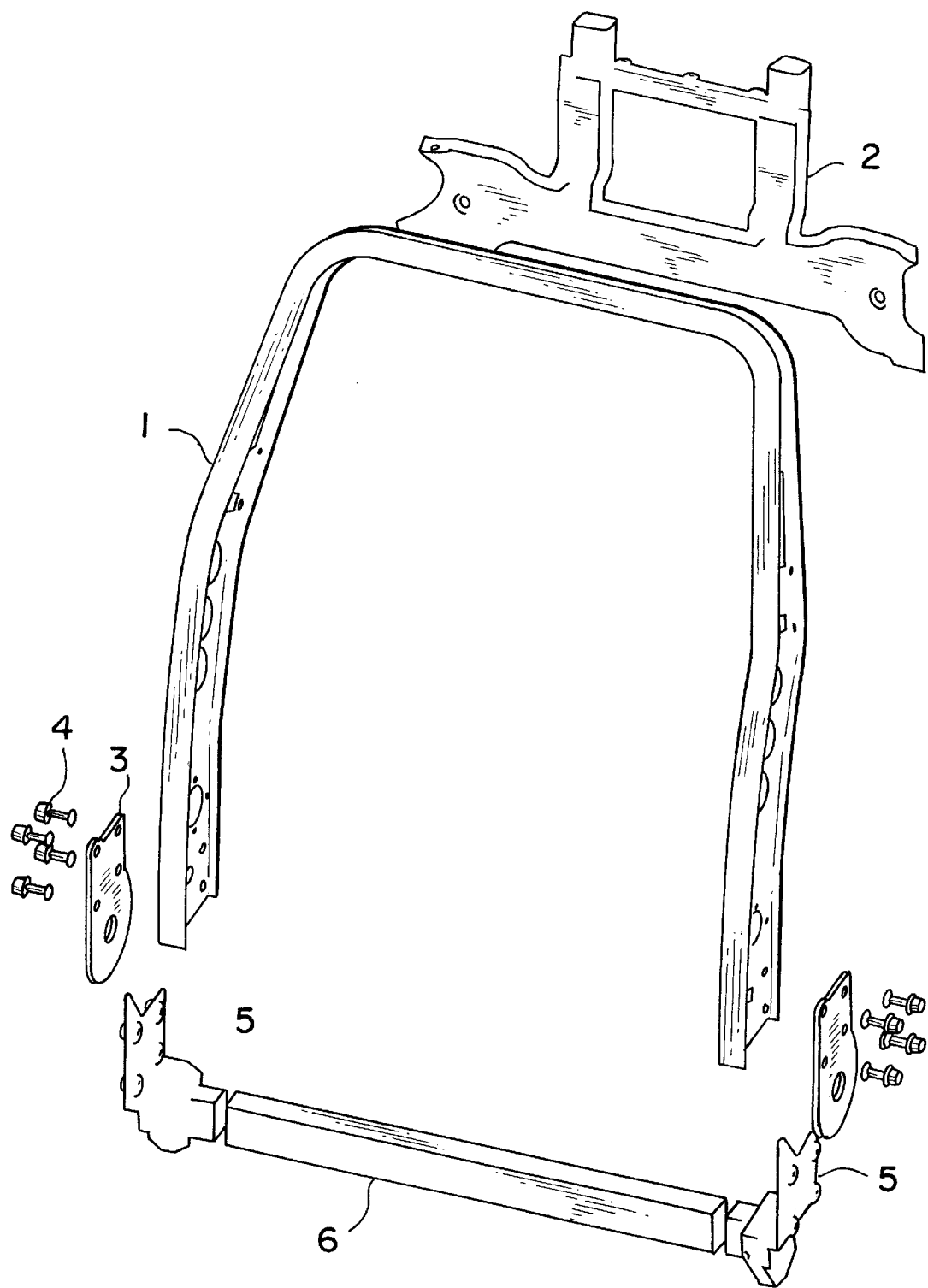

BACKREST CONSTRUCTION

BACKGROUND OF THE INVENTION

1. Field of the Invention

This invention relates to a backrest construction for the front seat of a motor vehicle with a backrest frame, a head arranged on the top of the frame, a lower node arranged on the underside of the backrest frame on both sides, and with a lower crossbeam arranged between the lower node points.

2. Description of Related Art

Lightweight designs are being introduced to an ever greater extent in the field of automotive engineering in order to minimize fuel consumption. Because of the different variants in motor vehicle equipment, e.g., a two-door design, a four-door design, a design with electric or manual adjustment of the inclination of the backrest, a design with electric or manual head support drive, many different possible connection points are needed for these components, but then, if they are all integrated into the backrest construction, they contribute to its weight, which is thus in conflict with the idea of lightweight design.

To at least partially compensate for the expense due to using lightweight construction materials, which are very expensive, automatic fabrication is provided to reduce the cost of assembly.

If different materials or alloys are used, simple separation of materials should be provided for the purpose of recycling so that the recycled materials can be reused. In addition, add-on components of mass-produced steel back rests, most of which are in the form of fabricated steel sheet structures, should also be used as much as possible in the backrest design. Ultimately, load-bearing constructions as similar as possible should be possible with different types of vehicles to be able to save on development costs and optimize production costs.

SUMMARY OF THE INVENTION

The primary object of the present invention is, therefore, to provide a backrest construction for the front seat of a motor vehicle which can be manufactured easily as lightweight structures and can meet the above-mentioned requirements as much as possible.

This object is achieved according to this invention by the fact that the parts of the backrest construction are designed in part as extruded sections and in part as castings.

An especially preferred embodiment of this invention is described in greater detail below in conjunction with the drawings.

BRIEF DESCRIPTION OF THE DRAWINGS

The sole FIGURE of the drawings illustrates a preferred embodiment of the backrest construction according to this invention in an exploded perspective view.

DETAILED DESCRIPTION OF THE INVENTION

The backrest construction illustrated in the sole FIGURE is for the front seat of a motor vehicle and includes a backrest frame 1, a backrest head 2, a node point 5 arranged on each side of the lower end of the backrest frame 1 and a lower crossbeam 6 arranged between the lower node points 5.

The construction parts of which the backrest construction is comprised can be divided into two groups of components, namely, a first group formed of the backrest frame 1 and the backrest head 2, and a second group composed of the lower node points 5 and the crossbeam 6.

In the first group of components, the backrest frame 1 comprises an extruded profile part in the form of an I-beam with a varying cross section.

All of the basic spring suspension points, mounting points for a side airbag, etc. are included on backrest frame 1, which may have different structural heights. The most extensive structural identity of the add-on parts which are used with steel backrests is achieved inasmuch as the web of an I-beam resembles a steel sheet, and the backrest frame is made of such an I-beam.

Suitable materials for backrest frame 1 in the form of an extruded sectional part include wrought materials, in particular wrought aluminum alloys with a high ductility. It is especially important to use wrought materials with a high ductility in this area of a backrest since it is primarily responsible for absorbing energy in the event of a rear collision.

The backrest head 2 is designed as a lightweight component and is formed of a die-cast aluminum or magnesium part or an injection molded plastic part. However, other inexpensive secondary materials may also be used, because the loads are not so high and elongation in the plastic range (ductility) is not required. The elastic modulus of the material is primarily important for the structural design of backrest head 2.

Thread-cutting screws (not shown in this drawing) are used to connect backrest head 2 to backrest frame 1. Fastening of these screws can be automated, optimally, and permit a combination of different materials as well separation according to the types of material.

Rivets, double bend joining or, when using plastic parts, fusion of cylinders integrally molded onto the plastic parts may be used for joining the backrest head to the backrest frame.

The backrest head 2 has essentially the function of accommodating the head rest guides or rods, the protection of the head rest rods, the upper basic spring suspension points, the two-door lock release on a sedan, the electric drive for an electric head rest, the fastening points of the trim parts of the rear side of the backrest, and luggage guard panels, if necessary with certain models.

Since the tool costs of molded parts, such as die-cast aluminum and magnesium parts or injection molded plastic parts are relatively advantageous, different variants for two-door and four-door vehicles, for vehicles with electric head rests and manual head rests for vehicles with hard trim in the rear or with a bag covering, etc. can be manufactured easily.

Since the tool lifetime amounts to approximately 100,000 moldings with such parts, this can be regarded as mostly neutral with regard to cost.

The second subassembly is comprised of the lower node points 5 and the lower crossbeam 6. The connection between the node points 5 and the crossbeam 6 is formed by a glued plug-type connection, for example.

The lower crossbeam 6 is manufactured in the form of an extruded section, again, preferably from a wrought material, such as a wrought aluminum alloy. This is a part which is important in a collision and ensures the survival space in a side impact and is responsible for absorbing energy in the hip area in the event of a rear end collision.

For normal use of the seat, the crossbeam 6 serves as a torsion beam with asymmetrical loading on the backrest and to accommodate the lower basic spring suspension which usually consists of two holes. Since it has an extruded hollow cross section, an optimum design as a torsion beam or as a strut is possible.

The lower cast node points 5 serve to join the backrest frame 1 to the lower crossbeam 6, as reinforcement of the area of connection of the backrest adjuster, as an accommodation for the basic spring suspension, as a guide for the side pull with a two-door lock release and as the connection for the electric motor with an electric backrest adjuster. With regard to the profitability of different variants, the same statements as those made in conjunction with the backrest head 2 are also valid here. In addition, if several moldings are formed in one casting, at least one pair of node points may also be provided for the design with electric adjustment in addition to pairs of node points for the design with manual adjustment.

The first and second subassemblies are joined together in a form-fitting manner and are linked with connecting elements 3, 4 which are needed anyway for connecting the backrest adjuster. The connecting elements 4 may be, for example, rivets or screws. With such a mechanical fastening, no welding is necessary, so the weakening of the material at the welds which would otherwise occur is avoided.

While only a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. A backrest construction for the front seat of a motor vehicle, comprising the following structural parts:

a backrest frame formed of an extruded I-beam section of a wrought material;

a backrest head arranged on a top side of the backrest frame and formed of a part cast of a material selected from the group consisting of aluminum, magnesium, alloys of aluminum, and alloys of magnesium;

lower node points arranged on each side of a lower end of the backrest frame and made parts cast of a material selected from the group consisting of aluminum, magnesium, alloys of aluminum, and alloys of magnesium; and a lower crossbeam arranged between the lower node points and formed of an extruded section of a wrought material.

* * * * *